United States Patent [19]
Otake

[11] Patent Number: 6,157,550
[45] Date of Patent: Dec. 5, 2000

[54] SWITCHING POWER SUPPLY CIRCUIT

[75] Inventor: Tetsushi Otake, Tsurugashima, Japan

[73] Assignee: Toko, Inc., Japan

[21] Appl. No.: 09/515,726

[22] Filed: Feb. 29, 2000

[30] Foreign Application Priority Data

Mar. 18, 1999 [JP] Japan ................................. 11-073812

[51] Int. Cl.[7] .............................................. H02M 3/335
[52] U.S. Cl. .............................................. 363/21; 363/97
[58] Field of Search ................................ 363/21, 97, 131

[56] References Cited

U.S. PATENT DOCUMENTS

| | | | |
|---|---|---|---|
| 4,079,294 | 3/1978 | Teuling | 363/21 |
| 5,285,368 | 2/1994 | Ishikawa | 363/21 |

Primary Examiner—Shawn Riley
Attorney, Agent, or Firm—Norris, McLaughlin & Marcus, P.A.

[57] ABSTRACT

A switching power supply circuit arranged such that stability of each output voltage is enhanced and the device is kept from being large-sized. Secondary winding N2 of transformer T1 is grounded at one end through diode D1: the other end of the secondary winding N2 is connected to first output terminal 2; and tap CT thereof is coupled to second output terminal 3 through diode D2; and capacitors C2 and C3 are connected between the first output terminal 2 and ground and between the second output terminal and ground respectively. In addition to being arranged as above, the present switching power supply circuit is further arranged such that first output voltage $V_{O1L}$ is obtained from feedback voltage generated at the whole of the secondary winding N2, while second output voltage $V_{O2H}$ is obtained from combination of induced voltage generated at winding section n21 defined through division by the tap CT of the secondary winding N2 and the first output voltage $V_{O1L}$.

3 Claims, 2 Drawing Sheets

SWITCHING POWER SUPPLY CIRCUIT

BACKGROUND OF THE INVENTION

1. Field of the Invention

The present invention relates to a switching power supply circuit arranged to provide a plurality of output voltages, and more particularly it pertains to a technique for keeping the device from becoming large-sized while maintaining a desired stability of each output voltage.

2. Description of the Prior Art

It has recently been regarded as a matter of course that an electronic equipment includes a number of functional circuits or devices and two or more types (values) of driving voltages should be applied to such functional circuits or devices.

In an attempt to provide a plurality of voltages of different values, it may be considered to use a power supply apparatus including as many a power supply circuits as required to obtain such voltages. Disadvantageously, however, as the number of power supply circuits increases, the cost and size of the apparatus will also increase accordingly. Thus, it is often the case that a multi-output type switching power supply circuit is employed which is arranged to derive a plurality of output voltages of different values from a single power supply circuit.

An example of such multi-output type switching power supply circuit is shown in FIG. 3 illustrating a conventional switching power supply circuit.

To have a better understanding of the present invention, description will first be made of a conventional circuit shown in FIG. 3, wherein main current passage of a switching transistor Q1 and primary winding N5 of a transformer T3 are connected in series with each other between a high potential side input terminal 1 and ground; and a control circuit 4 is connected to the base of the switching transistor Q1. The ground serves as a reference potential point for the circuit of FIG. 3. Low potential side input terminal and each low potential side output terminal are not shown, but they are assumed to be grounded. A capacitor C1 serving as a filter is connected between the input terminal 1 and the ground. Secondary winding N6 of the transformer T3 is grounded at one end and connected at the other end to the first output terminal 2 through a diode D1; and a capacitor C2 is connected between the first output terminal 2 and the ground. Tap CT provided at a predetermined position on the secondary winding N6 is connected to second output terminal 3 through a diode D2; and a capacitor C3 is connected between the second output terminal 3 and the ground. Further, a series connection of resistors R1 and R2 for detecting output voltage is connected between the first output terminal 2 and the ground, so that voltage signal occurring at the connection point between the resistors R1 and R2 is supplied to the control circuit 4.

With the above-arranged circuit of FIG. 3, the switching transistor Q1 is repetitively turned on and off in accordance with a driving signal derived from the control circuit 4. As a result, an AC voltage is generated in the secondary winding N6 of the transformer T3. AC voltage occurring across the whole of secondary winding N6 is rectified and smoothed out by means of the diode D1 and capacitor C2 so that a first output voltage $V_{O1H}$ occurs at the first output terminal 2. Further, an AC voltage occurring in a ground-side winding section of n62 of the secondary winding divided by the tap CT is rectified and smoothed out by means of the diode D2 and capacitor C3 so that a second output voltage $V_{O2L}$ occurs at the second output terminal 3.

Both the first output voltage $V_{O1H}$ and second output voltage $V_{O2L}$ are obtained from flyback voltage occurring in the secondary winding N6; thus, the first output voltage $V_{O1H}$ turns out to be higher than the second output voltage $V_{O2L}$ derived from a portion of the secondary winding N6.

Voltage signal which occurs at the connection point between the resistors R1 and R2 corresponds in magnitude to the first output voltage $V_{O1H}$ occurring at first output terminal 2. In case the first output voltage $V_{O1H}$ is changed from a prescribed value for some reason, the control circuit 4 will operate to permit the pulse width of the driving signal to be changed in accordance with the voltage signal occurring at the connection point between the resistors R1 and R2, whereby the on-of period ratio, or on duty of the switching transistor Q1 is changed, thus resulting in flow rate per unit time of current flowing through the primary winding N5 being changed so that the amount of energy transferred from the primary side to the secondary side of the transformer T3 is changed. Thereupon, the first output voltage $V_{O1H}$ is subjected to such an action as to cause the magnitude of the first output voltage to be returned to the original specified voltage value in accordance with the amount of transferred energy.

As described above, in the conventional circuit shown in FIG. 3, the first output voltage $V_{O1H}$ is stabilized substantially at the specified value through control of switching operation based on the magnitude of output voltage, or so-called feedback control.

With the first output voltage $V_{O1H}$ being stabilized at a substantially constant value, the second output voltage $V_{O2L}$ will also be stabilized at a substantially constant value, unless there exists any external cause such as changes in an external load connected to each of the output terminals and/or changes in input voltage $V_{IN}$.

The conventional switching power supply circuit such as shown in FIG. 3 is arranged such that the first output voltage $V_{O1H}$ of a higher value is derived from the whole of the secondary winding N6. Needless to say, in an attempt to make such a switching power supply circuit, the number of turns of the secondary winding N6 of the transformer T3 is determined on the basis of the maximum one of output voltages to be obtained. Thus, it is required that the number of turns of the secondary winding N6 be increased so as to produce such a high voltage. Obviously, this will result in the transformer T3 being large-sized, which will inevitably lead to such an undesired phenomenon that the switching power supply circuit or power supply device turns out to be large-sized.

With the circuit shown in FIG. 3, the first output voltage $V_{O1H}$ derived from the whole of the secondary winding N6 is stabilized so that the second output voltage $V_{O2L}$ derived from part of the secondary winding N6 is also stabilized on the basis of the theory of voltage divider circuit.

In actuality, however, even if the first output voltage $V_{O1H}$ is stabilized, the second output voltage $V_{O2L}$ tends to be changed due to changes in various factors, especially due to great increase and decrease in output current. It may be considered that this is due to the fact that in an actual product, the electromagnetic coupling between the respective windings of the transformer constituting the power supply circuit is not perfect (the coupling coefficient is not 1.0); voltage drop resulting from current flow through electric resistance present in the respective windings and winding sections is changed with a variation in the magnitude of the current; and so forth.

As will be seen from the above discussion, the conventional switching power supply device of such a circuit arrangement as shown in FIG. 3 is disadvantageous in that in case the external load is greatly changed, it is not possible to expect a high stability of the second output voltage $V_{O2L}$ which is not subjected to feedback control.

SUMMARY OF THE INVENTION

Accordingly, it is an object of the present invention to provide a switching power supply circuit which is designed such that each output voltage represents an enhanced stability and yet the device can be kept from being large-sized.

Briefly stated, according to an aspect of the present invention, there is provided a switching power supply device comprising a series circuit of a switching element and first winding; a first rectifying element connected between a reference potential point and a first output terminal in such a manner that the first rectifying element is connected to the reference potential point; a series circuit of a second winding and third winding; a first capacitance element connected between the reference potential point and the first output terminal; a second rectifying element connected between the connection point between the second and third windings and a second output terminal; a second capacitance element connected between the reference potential point and the second output terminal; and a control circuit for controlling the operation of the switching element.

In a preferred embodiment of the present invention, a transformer including a secondary winding having a tap provided at a predetermined position is employed; a primary winding of the transformer and the switching element are connected in series with each other between an input terminal and ground; the secondary winding of the transformer is connected at one end thereof to the reference potential point through the first rectifying element and the other end thereof is connected directly to the first output terminal; the tap provided at the predetermined position on the secondary winding is coupled to the second output terminal through the second rectifying element; and the first capacitance element is connected between the first output terminal and ground, and the second capacitance element is connected between the second output terminal and ground.

With the foregoing circuit arrangement, a first output voltage at the first output terminal side is obtained from flyback voltage generated in the entire secondary winding, while a second output voltage at the second output terminal side is obtained from a combination of an induced voltage generated in one of windings sections defined by means of the tap provided on the secondary winding.

Other objects, features and advantages of the present invention will become apparent from the ensuing description taken in conjunction with the accompanying drawings.

DESCRIPTION OF THE PREFERRED EMBODIMENTS

Figure 1:
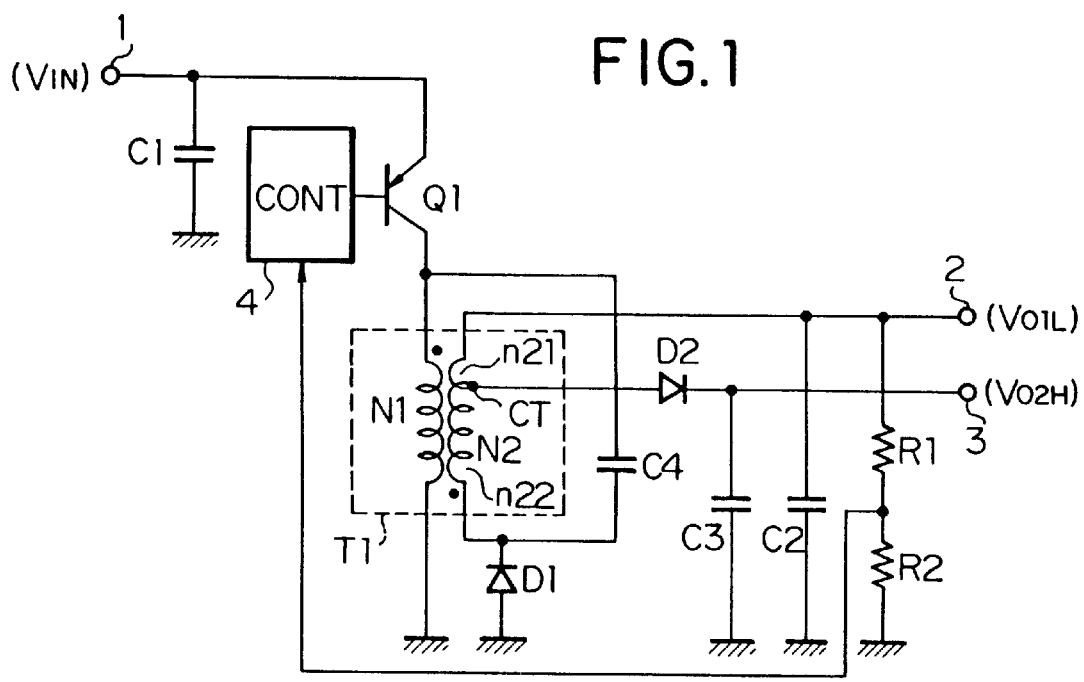
FIG. 1 is a circuit diagram illustrating the switching power supply circuit according to a first embodiment of the present invention.

Referring to FIG. 1 of the accompanying drawings, there is shown the switching power supply circuit according to a first embodiment of the present invention, which exhibits an enhanced stability of respective output voltage and is adapted to avoid tendency for the device to become large-sized.

The circuit shown in FIG. 1 is arranged as follows:

Main current path of PNP type switching transistor Q1 and primary winding N1 of transformer T1 are connected in series between an input terminal 1 and ground; control circuit 4 is coupled to the base of the switching transistor Q1; secondary winding N2 of the transformer T1 is connected at one end thereof to cathode of diode D1 having anode thereof grounded; the other end of the secondary winding N2 is tied to a first output terminal 2; and capacitor C2 is connected between the output terminal 2 and the ground.

Further, a serial connection of resistors R1 and R2 adapted to serve as voltage detecting circuit is connected between the output terminal 2 and the ground, so that voltage signal occurring at the connection point between the resistors R1 and R2 is inputted to the control circuit 4. Tap CT provided at a predetermined position on the secondary winding N2 is coupled to anode of diode D2 having cathode thereof connected to a second output terminal 3, and capacitor C3 is connected between the output terminal 3 and the ground. Capacitor C4 is connected between the diode D1 side end of the secondary winding N2 and the switching transistor Q1 side end of the primary winding N1, and filtering capacitor C1 is connected between the input terminal 1 and the ground.

The switching transistor Q1 in off state is turned on by a signal derived from the control circuit 4, whereupon flyback voltage resulting from energy stored when the switching transistor Q1 is in the on state occurs at each winding of the transformer T1. As a result, the flyback voltage occurring at the entire secondary winding N2 is applied across the capacitor C2 through the diode D1 now rendered conductive with respect to the flyback voltage; thus the capacitor C2 is charged so that voltage generated across the capacitor C2 is permitted to occur as first output voltage $V_{O1L}$ at the output terminal 2. During steady-state operation, the first output voltage $V_{O1L}$ is stabilized by means of feedback control system comprising a control circuit 4 and switching transistor Q1.

The switching transistor Q1 is changed over to on state by a signal derived from the control circuit 4; thereupon, a current is caused to flow through the primary winding N1 of the transformer T1 so that induce voltage is generated at each winding of the transformer T1. At this point of time, the induced voltage generated at a winding portion n21 of the secondary winding N turns out to be forward with respect to the diode D2, so that voltage equal to sum of the induced voltage generated at the winding portion 21 and voltage across the capacitor C2 is applied across the capacitor C3 through the diode D2. Thus, the capacitor C3 is charged so that a voltage occurring thereacross appears as output voltage $V_{O2H}$ at the output terminal 3.

Consequently, the switching transistor Q1 is again changed over to off state by a signal supplied thereto from the control circuit 4.

Compared with the conventional circuit, the circuit of the present invention shown in FIG. 1 is characterized in that the first output voltage $V_{O1L}$ is obtained from flyback voltage generated at the secondary winding N2 while the second output voltage $V_{O2H}$ is obtained from the induced voltage generated at the secondary winding N2 and first output voltage $V_{O1L}$; and the second output voltage $V_{O2H}$ derived from the tap CT of the secondary winding N2 turns out higher than the first output voltage $V_{O1L}$ derived from the whole of the secondary winding N2.

With the switching power supply circuit according to the present invention, the secondary winding N2 of the transformer T1 has the specification such as number of winding turn thereof determined based on lower one of the output voltages so that if the output voltage to be derived from the whole of the secondary winding N2 is low, then the number of turn of the winding N2 may be less, thus making it possible to prevent the transformer T1 from being large-sized. In this way, it is possible to prevent the switching power supply circuit and power source device from turning out to be large-sized.

Further, with the circuit of FIG. 1, by virtue of the fact output voltage resulting from energy of flyback voltage is only the first output voltage $V_{O1L}$, it is possible to reduce adverse effect of change in output current at the first output terminal 2 side upon the second output voltage $V_{O2H}$, for example. Besides, the second output voltage $V_{O2H}$ is determined from the first output voltage $V_{O1L}$ and the induced voltage generated in the winding section n2. In this case, the first output voltage $V_{O1L}$ is kept substantially constant by feedback control, and the induced voltage is determined depending upon the the turn ratio of the first winding N1 to the winding section n21 and the input voltage $V_{IN}$; thus, if the input voltage $V_{IN}$ is stabilized, then the second output voltage $V_{O2H}$ also represents a stabilized value. Consequently, the second output voltage $V_{O2H}$ exhibits high stability.

Even if the output voltage $V_{IN}$ is changed, the second output voltage $V_{O2H}$ will represent only a limited amount of change if the first output voltage $V_{O1L}$ is constant; thus, with the present circuit, there never occurs such a situation that the stability of the second output voltage $V_{O2H}$ is lower than that in the conventional circuit.

Although a detailed description was omitted, the capacitor C4 is used in combination with the capacitor C2 in such a circuit arrangement as shown in FIG. 1. In this case, the capacitors C4 and C2 serve to permit AC component of voltage occurring at one end of the primary winding N1 of the transformer T1, thus constituting energy transfer means separate from that constituted by electromagnetic coupling between the primary and secondary windings of the transformer T1. Advantageously, the provision of the capacitor C4 in the circuit arrangement results in the efficiency of the power supply circuit being higher than in absence of such capacitor. The capacitor C4 may be omitted depending on the specification of the power supply.

Figure 2:
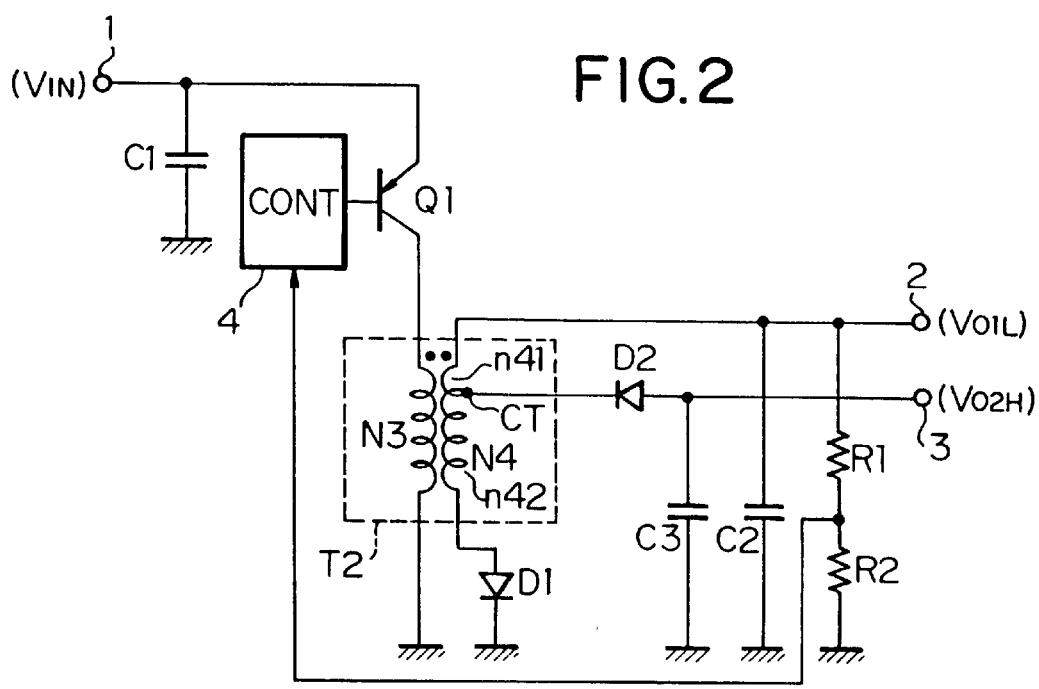
FIG. 2 is a circuit diagram illustrating the switching power supply circuit according to a second embodiment of the present invention.
Figure 3:
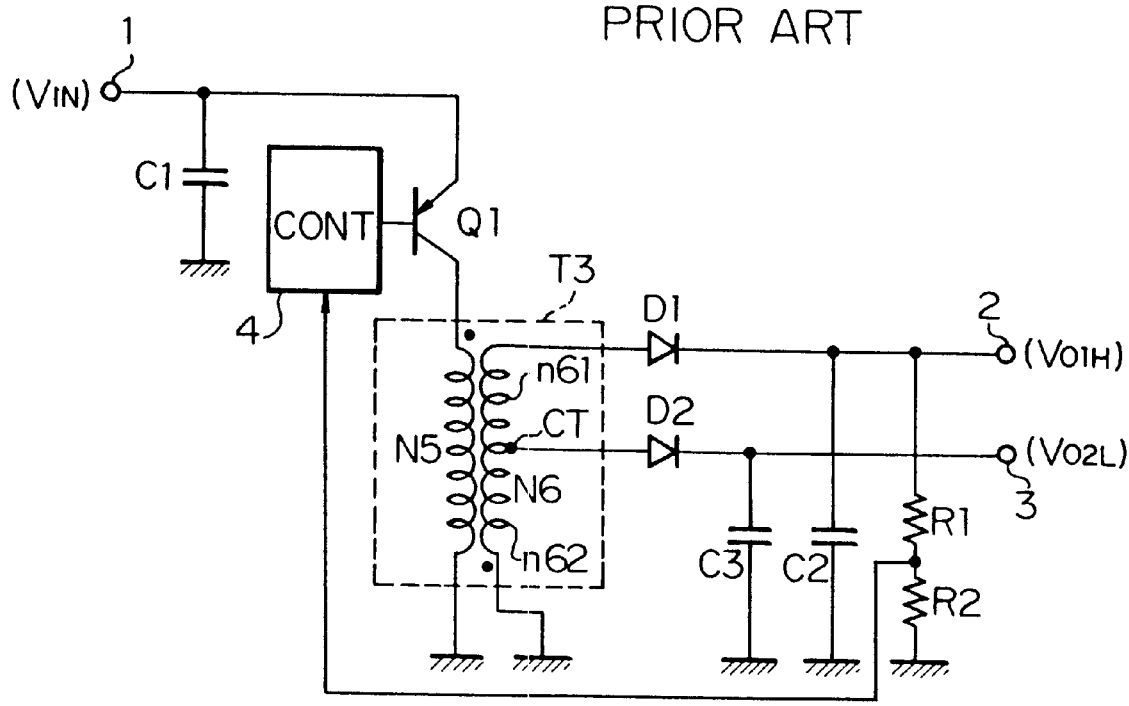
FIG. 3 is a circuit diagram showing an example of conventional multi-output type switching power supply circuit.

Referring now to FIG. 2, there is shown a circuit diagram of the switching power supply circuit according to a second embodiment of the present invention.

In contrast to the circuit of FIG. 1 wherein each output voltage becomes positive with respect to the ground potential, the circuit of FIG. 2 is arranged such that each output voltage becomes negative with respect to the ground potential.

In the circuit arrangement shown in FIG. 2, use is made of a transformer T2 including a secondary winding N4 which is reverse in polarity to the secondary winding N2 of the transformer T1 in the circuit of FIG. 1; diodes D1 and D2 have their anodes and cathodes connected in opposite polarity to those in FIG. 1; and the capacitor C4 provided in the circuit of FIG. 1 is omitted. The remainder of FIG. 2 circuit is identical with that of the FIG. 1 circuit.

With such circuit arrangement, when the switching transistor Q1 is turned off to cause flyback voltage to be generated at the secondary winding, the flyback voltage generated at the whole of the secondary winding N4 is applied to the capacitor C2 so that the latter is charged, and voltage generated across the capacitor C2 turns out to be the first output voltage $V_{O1L}$.

On the other hand, when the switching transistor Q1 is changed over to on state, an induced voltage occurs at the secondary winding N2, and a voltage resulting from a combination of an induced voltage at winding section n41 and the first output voltage $V_{O1L}$ is applied to the capacitor C3 so that the latter is charged, and voltage generated across the capacitor C3 turns out to be the second output voltage $V_{O2H}$. Incidentally, the polarity of the secondary winding N4 results in the first output voltage $V_{O1L}$ and second output voltage $V_{O2H}$ being negative with respect to ground.

As can be seen, the circuit of FIG. 2 operates substantially in the same manner as the circuit of FIG. 1, except that the signs of the output voltages with respect to ground in the former are opposite to those in the latter.

Although in the embodiments of the present invention shown in FIGS. 1 and 2, the present invention has been applied to switching power supply circuit arranged to provide two, first and second, output voltages, it will readily be understood that the present may also equally be applied to a power supply device arranged to provide three or more output voltages.

Further, although in each of the foregoing embodiments, the secondary winding was provided with a tap to divide the secondary winding into two winding sections and an induced voltage occurring at one of the winding sections is utilized, it is also possible that a transformer including a primary, a secondary and a tertiary winding may be employed with the secondary and tertiary windings being connected to each other so that a circuit arrangement may be constructed which is equivalent to the embodiments of the present invention.

As described above, the switching power supply circuit according to the present invention is arranged in such a manner that a secondary winding of a transformer is connected at one end thereof to a reference potential point through a first rectifying element; the other end of the secondary winding is connected directly to a first output terminal; and a tap provided at a predetermined position on the secondary winding is connected to a second output terminal through a second rectifying element. In addition to being arranged in this manner, the switching power supply circuit according to this invention is characterized in that output voltage at the first output terminal side is obtained from flyback voltage occurring at the whole of the secondary winding, while output voltage at the second output terminal side is obtained from a combination of induced voltage generated at one of the winding sections divided by means of the tap of the secondary winding and the output voltage at the first output terminal side.

As will be appreciated from the foregoing discussion, according to the present invention, output voltage to be derived from the whole of the secondary winding is low so that any extra amount of winding is not needed, thereby making it possible to keep the transformer from becoming large-sized. Another advantage is that output voltages of enhanced stability, though not controlled, can be obtained by virtue of the fact that second output voltage is obtained from first output voltage stabilized through feedback control and induced voltage generated in the secondary winding.

In this way, the present invention provides a multi-output type switching power supply circuit arranged such that stability of each output voltage is enhanced and the device is kept from being large-sized.

While the present invention has been illustrated and described with respect to specific embodiments thereof, it is to be understood that the present invention is by no means limited thereto but encompasses all changes and modifications which will become possible within the scope of the appended claims.

What is claimed is:

1. A switching power supply circuit comprising:
   a first series circuit of a switching element and a first winding;
   a second series circuit of a first rectifying element, a first winding, and a second winding, said series circuit being connected between a reference potential point and a first output terminal, said first rectifying element being connected to said reference potential point;
   a first capacitance element connected between said reference potential point and said first output terminal;
   a second rectifying element connected between connection point between said second and third windings and a second output terminal;
   a second capacitance element connected between said reference potential point and said second output terminal; and
   a control circuit for controlling operation of said switching element.

2. A switching power supply circuit according to claim 1, further comprising a transformer including a primary winding constituted by said first winding, wherein the connection point between said second winding and said third winding is adapted to serve as tap provided on a secondary winding of said transformer, and wherein said second winding is constituted by one of winding sections of said secondary winding divided by means of said tap, and said third winding is formed by the other one of said winding sections.

3. A multi-output type switching power supply circuit wherein a plurality of output voltages of different values are obtained from voltage which is generated in a secondary winding of a transformer through on-off operation of a switching element, characterized in that:
   a first output voltage is obtained from a flyback voltage which is generated in the whole of said secondary winding when said switching element is in off state, and a second output voltage higher than said first output voltage is obtained from a combination of an induced voltage generated in part of said secondary winding and said first output voltage when said switching element is in on state; and
   said first output voltage is stabilized by means of a control system including said switching element and a control circuit connected to a control terminal of said switching element.

* * * * *